June 21, 1938.                L. H. LYTLE                2,121,436
                          THREAD PROTECTOR
                         Filed Feb. 25, 1937
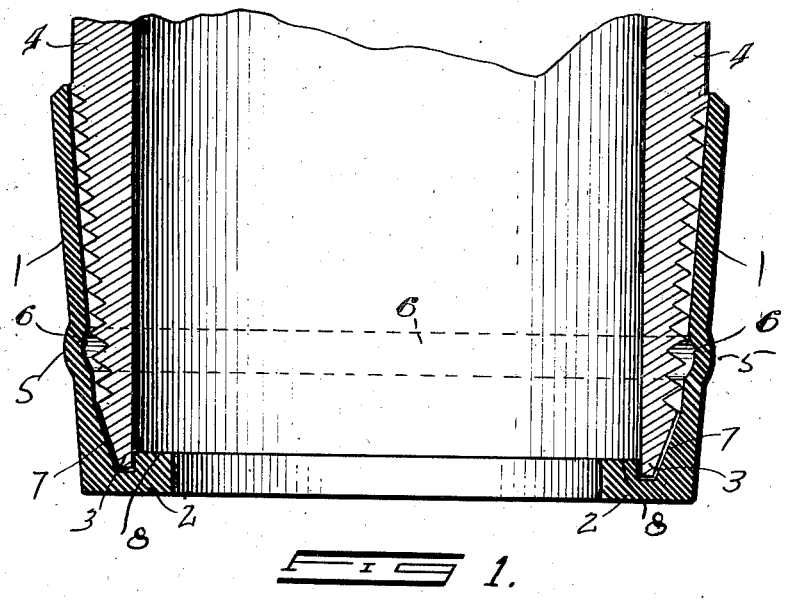
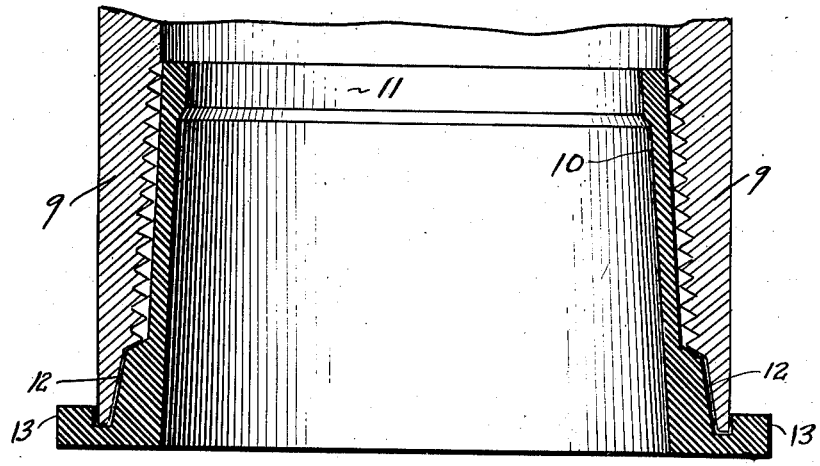
Leroy H. Lytle
INVENTOR.
BY W. B. Harpman
ATTORNEY Patented June 21, 1938

2,121,436

UNITED STATES PATENT OFFICE 2,121,436

THREAD PROTECTOR

Leroy H. Lytle, Alliance, Ohio

Application February 25, 1937, Serial No. 127,698

2 Claims. (Cl. 138—96)

REISSUED
MAR 12 1940

This invention relates to thread protectors.

The principal object of this invention is to provide a thread protector formed of rubber or other resilient material, adapted to be placed on the threaded ends of pipes or tubes and within the threaded couplings on pipes or tubes.

A further object of this invention is to provide a thread protector of rubber or other resilient material so designed as to hold itself firmly upon the threads being protected once it has been placed in position.

A still further object of this invention is to provide a thread protector formed of rubber or other resilient material and designed to protect the ends of the tubes or coupling and permit the tube and coupling to be tested without the use of any additional gaskets or packing positioned in or on the face plate of the testing apparatus.

This thread protector has been designed for a dual purpose, that of protecting the threads during handling and that of providing a suitable gasket effect when the tube is being hydraulically tested. Prior to the adoption of this protector it has been necessary in the testing of tubes to place them between a pair of oppositely disposed face plates having circular grooves therein of the same size as the pipe being tested. These grooves are usually packed with hemp or other gasket material to form a tight joint. A great deal of time is wasted due to the necessity of repeatedly repacking these grooves to insure an accurate test, and additional time is wasted in changing the face plates at such times as various sizes of tubes are to be tested. In using my invention it is possible to eliminate this waste of time entirely as the face plates used have a continuously smooth surface and readily accommodate any size of tube while the thread protector itself forms the necessary gasket for a tight testing connection.

Under some conditions it may be desirable to more adequately protect the threads, and therefore this thread protector of rubber or other resilient material, has been designed to permit the use of a secondary metal cup shaped casing, such as is shown in my co-pending application on Thread protectors, Ser. No. 101,605, filed September 19, 1936. However, it will be obvious that for ordinary mill or ware-house handling this protector, formed of rubber or other resilient material, provides adequate protection.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a side elevation, with parts in cross section, of a thread protector adapted for use on the outer threaded end of a tube, and Figure 2 is a side elevation, with parts in cross section, of a thread protector adapted for use on the inner threaded end of a coupling.

By referring to Figure 1 of the drawing it will be seen that I have provided a thread protector 1 formed preferably of rubber, and having U-shaped end sections 2 formed so as to fit tightly over the end 3 of a tube 4. The outer side wall of this thread protector 1 is formed with a continuous convex ridge 5 thereon, while the inner wall is formed with a continuous matching slightly concave depression 6. The convex ridge 5 and concave depression 6 are formed in the side wall of the thread protector for the purpose of providing efficient friction contact with any metallic cup shaped casing that might be placed thereon for additional protection.

By referring to the construction of the U-shaped end portion 2 of the thread protector 1 it will be apparent that the tapered inner wall 7 insures sufficient body at this point to adequately protect the tapered end of the tube 4, and in conjunction with the up-turned portion 8 of the U-shaped end portion 2, will provide adequate body to form an efficient continuous gasket over the end of the tube for testing purposes.

By referring to Figure 2 it will be seen that a modified form of my invention provides for the adequate protection of the inner threaded ends of a coupling 9. A thread protector 10 has a ridge portion 11 formed at its inner end adapted to secure any metallic cup shaped casing that may be inserted therein, and has a tapered outer portion 12 to protect the tapered end of the coupling. An outer U-shaped portion 13 together with this tapered outer portion 12 provides sufficient body to insure an efficient continuous gasket around the end of the coupling for testing purposes. It is obvious that this protector may be also used on the threaded inner ends of pipes or tubes and similar objects, as it will be just as practical in that use as it is on the coupling.

What I claim is:—

1. A thread protector formed of resilient material and adapted to cover the threaded inner end of a coupling, a ridge portion formed at its inner end adapted to secure a metallic cup shaped casing that may be inserted therein, together with a U-shaped end section designed to fit snugly over the end of a coupling forming a protective covering and suitable flat faced testing gasket.

2. A thread protector formed of resilient material and adapted to cover the threaded inner end of a coupling, a ridge portion formed at its inner end adapted to secure a metallic cup shaped casing that may be inserted therein, together with a U-shaped end section comprising a tapered section of the side wall and an outer and up-turned portion designed to fit snugly over the end of a coupling forming a protective covering and suitable flat faced testing gasket.

LEROY H. LYTLE.